UNITED STATES PATENT OFFICE.

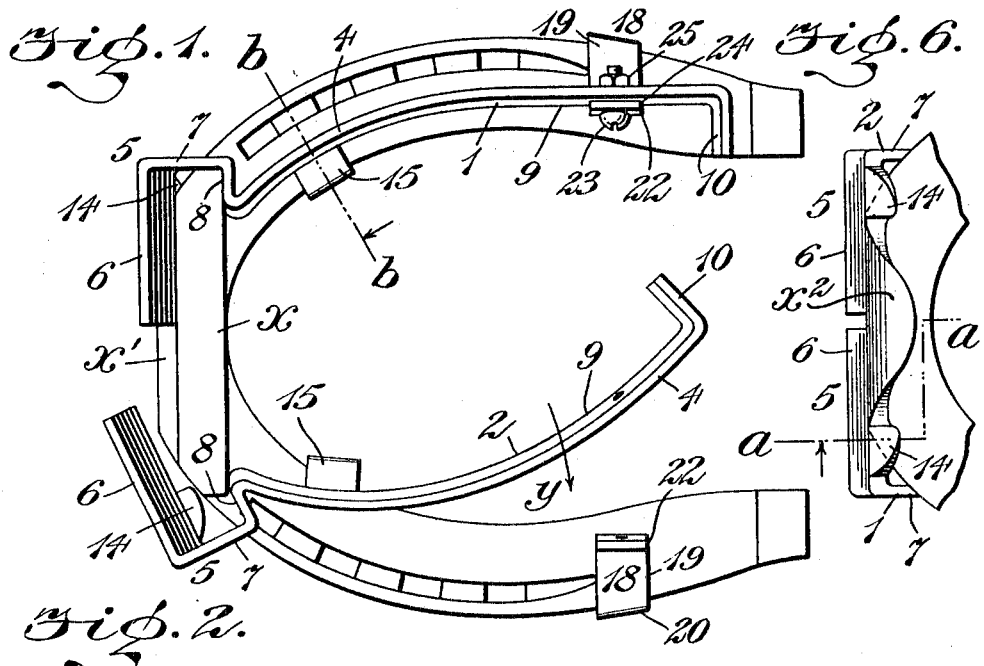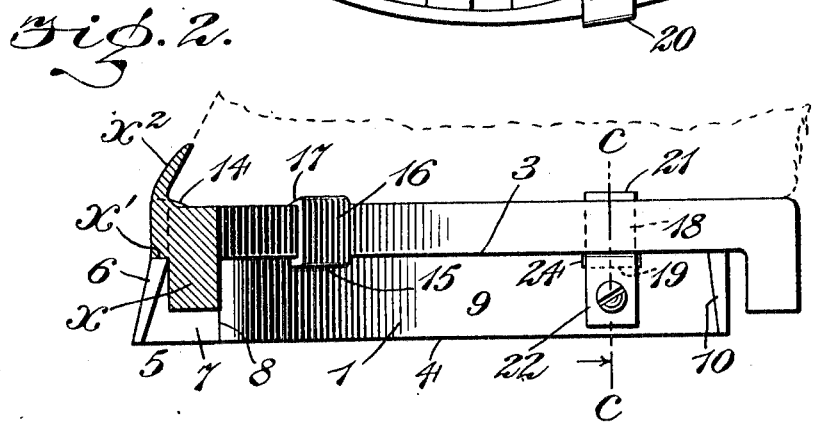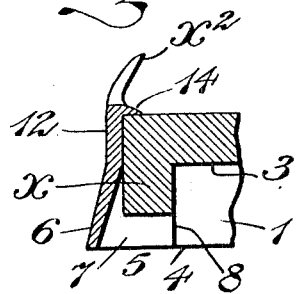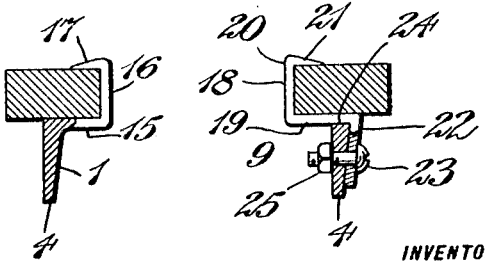

HENRY H. STREESEMAN, OF YONKERS, NEW YORK.

ANTISLIPPING DEVICE.

1,118,697.     Specification of Letters Patent.     Patented Nov. 24, 1914.

Application filed July 8, 1914. Serial No. 849,632.

*To all whom it may concern:*

Be it known that I, HENRY H. STREESEMAN, a citizen of the United States, and a resident of Yonkers, in the county of Westchester, State of New York, have invented certain Improvements in Antislipping Devices, of which the following is a specification.

This invention relates to certain improvements in anti-slipping devices, such as are especially designed and adapted for use in connection with horse shoes and the like, to prevent the animals from slipping, and the object of the invention is to provide a device of this general character of a simple and comparatively inexpensive nature, and of a strong and durable construction, having novel and improved means for holding it upon the shoe, whereby the device may be quickly and conveniently applied to the shoe, and when in place thereon will be securely held in position during use.

The invention consists in certain novel features of the construction, and combinations and arrangements of the several parts of the improved anti-slipping device, whereby certain important advantages are attained, and the device is rendered simpler, less expensive, and otherwise better adapted and more convenient and effective during use, all as will be hereinafter fully set forth.

The novel features of the invention will be carefully defined in the claims.

In order that my improvements may be the better understood, I will now proceed to describe the invention with reference to the accompanying drawings, wherein—

Figure 1 is an underside view of a horse shoe provided with anti-slipping devices constructed according to my invention; Fig. 2 is a sectional view taken centrally through the horse shoe, showing the improved anti-slipping device applied thereto as viewed from the inner side; Fig. 3 is a sectional detail view taken in the plane indicated by the line $a$—$a$ in Fig. 6, showing certain features of the forward attaching means; Fig. 4 is a view similar to Fig. 3, but taken in the plane indicated by the line $b$—$b$ in Fig. 1, and showing features of construction of the intermediate attaching means of the improved anti-slipping device; Fig. 5 is a view similar to Figs. 3 and 4, but taken in the plane indicated by the line $c$—$c$ in Fig. 2, and showing features of construction of the rear attaching means; and Fig. 6 is a fragmentary view showing a portion of the forward part of the shoe, as viewed from the upper surface and illustrating the arrangement of the forward attaching means upon the improved anti-slipping device.

As shown in these views, the improved anti-slipping device comprises two members, 1 and 2, similar to one another, but reversely curved, so as to be adapted to be fitted together beneath the opposite sides of the shoe to which the device is to be applied for use, each of said members being formed from an integral elongated piece or strip of resilient metal of appropriate hardness, such for example, as steel, bent or otherwise shaped to conform to the curvature of the side of the shoe and having its upper edge surface 3 adapted for secure and accurate engagement against the underside of the shoe throughout substantially its entire length, and its lower edge surface 4 pendent below the shoe and affording a narrow hardened bearing surface extended continuously along the side of the shoe and adapted for secure engagement with the roadway to prevent the animal from slipping.

As shown in the drawings, each of the members 1 and 2 of the improved anti-slipping device is provided at its forward end with an angular bent portion 5, adapted to fit around the corresponding side of the toe calk $x$ of the shoe to which the device is applied for use, said angular forward portion 5 comprising a straight forward part or jaw 6, adapted to extend along the forward surface of the toe calk and having its upper edge surface adapted for secure contact against the shoulder $x^1$ commonly provided at the underside of the shoe in advance of said toe calk, an intermediate straight part 7 directed rearwardly from the outer end of said forward part 6 and adapted to pass along the lateral surface of the toe calk of the shoe, and a rear inwardly directed part or jaw 8, parallel with but spaced to the rear of said forward part or jaw 6, and adapted when the device is in place upon the shoe, to be extended inwardly across the under surface of the shoe immediately to the rear of said toe calk $x$ in such a way that the latter is embraced between said forward and rear parts or jaws 6 and 8, as clearly shown at the member 1 in Fig. 1 of the drawings. As herein shown the forward part or jaw 6 of the angular portion 5 of each member 1 and 2 of the device is also swaged or inclined forwardly at its lower edge portion so as to better withstand the stress imposed thereon during use, and to assure more accurate contact of its upper edge surface with the shoulder $x^1$ at the forward part of the horse shoe. Beyond the angular forward portion 5, each member 1 and 2 of the improved anti-slipping device is also provided with an elongated rearwardly directed resilient shank portion 9, herein shown as made slightly curved, and adapted, when the device is in place upon the shoe, as indicated at the member 1 in Fig. 1, to fit securely beneath the underside of the quarter of the shoe, adjacent the following, its rear extremity having an outwardly directed angular part 11 adapted to be extended transversely across the underside of the shoe in advance of the heel calk, so as to afford secure engagement with the pavement at the rear part of the shoe.

At opposite sides of its forward angular portions 5, each member 1 and 2 of the device is provided with reversely directed clips or shoe engaging devices 14 and 17, adapted by engagement with the upper surface of the shoe, adjacent to opposite edges thereof, to hold said forward portion of the member securely in place upon the shoe, and as herein shown, these clips or shoe engaging devices are integrally produced upon the upper edge portion of the member, and are so spaced that when the member is positioned at an inclination to the side of the shoe whereto it is to be applied, as indicated at the member 2 in Fig. 1, said clips may be passed up from the underside of the shoe, the one at the outer side and the other within the shoe until they come into position for engagement with the upper surface of the shoe, whereupon by turning the shank portion 9 of the member in the direction of the arrow $y$ in Fig. 1, said clips are forced into secure engagement with the upper surface of the shoe, while at the same time the angular part 5 of the member is caused to engage the lateral side of the toe calk $x$ affording a secure attachment of the forward end of the member to the shoe. In a practical sense it may be considered that the reversely directed shoe engaging clips 14 and 17 are carried by the jaw-like portions 6 and 8 at opposite sides of the toe calk, and that said jaw-like portions 6 and 8 are thereby enabled to securely grip the shoe between them when the shank portion 9 of the member is forcibly pressed outward in the direction of the arrow $y$.

As herein shown, the forward clip or shoe engaging device 14 is produced upon the upper end of a tongue or projection 12 integrally produced upon the upper edge of the forward part 6 of the angular portion 5, closely adjacent to the juncture of said forward part or jaw 6 with the intermediate part 7, so that when the improved anti-slipping device is used in conjunction with shoes having toe clips, as indicated at $x^2$ in Fig. 6, said shoe engaging devices 14 of the respective members are adapted to engage the upper surface of the shoe at opposite sides of such toe clip.

In the drawings the rear clips or shoe engaging devices 17 are shown produced at the upper ends of tongues or projections 16 integrally connected with the upper edge portion of each member 1 and 2 and likewise with the rear part or jaw 8 of the angular portion 5 thereof, by means of laterally directed parts 5 adapted to be extended inwardly beneath the shoe when the members are in place thereupon, whereby it will be seen that the tongues are permitted to pass up along the inner surfaces of the shoe while the shank portions 9, 9 of the members are seated securely beneath the under surface thereof.

The construction of each member of the improved anti-slipping device is of such a nature as to assure interlocking engagement of its forward end portion with the forward part of the shoe where its rearwardly directed portion 9 is forced or flexed outwardly as shown at the member 1 in Fig. 1, and in order to hold the members securely in position when in place upon the shoe, I have shown said rearwardly directed shank portion provided with shoe engaging devices adapted, when said shank portions are forcibly flexed outward to an extent sufficient to assure interlocking engagement of the forward end of the member with the forward part of the shoe, to lock and hold said shank portions securely in flexed condition, as indicated at the member 1 in Fig. 1.

In the drawings, the means provided for this purpose include angular clips 18 separately formed from the shank portions 9 of the members and each provided with a central part 19 adapted to underlie the shoe and to extend outwardly beneath the same through a notch or the like produced in the upper edge of the shank portion 9 of the corresponding member, the outer part 20 of said clip being extended upwardly across the outer surface of the shoe and having its upper end provided with an inturned prong 21 engageable upon the upper surface of the shoe while the inner part 22 of said clip is pendent against the inner surface of the shank portion 9 and carries a bolt or screw 23 adapted to penetrate an aperture 24 in the shank portion and provided with a nut 25 whereby the clip may be securely attached to the shank portion after the same shall have been forcibly flexed outward to an extent sufficient to hold the forward shoe engaging devices of the members securely in engagement with the forward part of the shoe.

It will be obvious from the foregoing description that my improved anti-slipping device, as herein set forth, is susceptible of some modification without material departure from the principle and spirit of my invention, and for this reason I do not wish to be understood as limiting myself to the precise formation and arrangement of the parts as herein set forth in carrying out my invention in practice.

Having thus fully described my invention, what I claim as new and desire to secure by Letters Patent is as follows:

1. A device of the character described comprising members each formed from an elongated piece of resilient metal adapted to be fitted beneath opposite sides of the shoe, each of said members having at its forward end spaced reversely arranged clips capable of application over the shoe at the inner and outer surfaces of the forward part thereof, and adapted when said member is turned in line with the quarter of the shoe, to engage over and grip the shoe, and a rearwardly directed resilient shank adapted, when the member is turned to engage said clips with the shoe, to be flexed for holding said clips in engaged relation, and means for holding the shank of each member in flexed position.

2. A device of the character described comprising members each formed from an elongated piece of resilient metal adapted to be fitted beneath opposite sides of the shoe, each of said members having its forward end provided with spaced jaws capable of application at opposite sides of the shoe and having reversely directed shoe engaging means adapted, when the member is turned, to be engaged over the shoe to lock said member in place thereon, and a shank extended rearwardly from said jaws and adapted, when the member is turned to lock the forward part of the member to the shoe, to be flexed beneath the quarter of the shoe to hold said shoe engaging devices in locked position, and means for holding the shank of each member in flexed condition.

3. A device of the character described comprising members each formed from an elongated piece of resilient metal adapted to be fitted beneath opposite sides of the shoe, each of said members having at its forward end an angular portion adapted to fit around one of the lateral sides of the toe calk of the shoe and provided with spaced reversely arranged clips capable of application over the shoe at the inner and outer surfaces of the forward part thereof, and adapted, when said member is turned in line with the quarter of the shoe, to engage over and grip the shoe, and a rearwardly directed resilient shank adapted when the member is turned to engage said clips with the shoe, to be flexed for holding said clips in engaged relation, and means for holding the shank of each member in flexed position.

4. A device of the character described having a member adapted to be fitted beneath the shoe provided with spaced reversely arranged jaws capable of application over the shoe at the inner and outer surfaces thereof and adapted, when said member is turned, to engage over and grip the shoe to hold said member in relation thereto, and means for holding said member against reverse movement when the same is turned to engage its jaws with the shoe.

5. A device of the character described having a member adapted to be fitted beneath the shoe provided with spaced reversely arranged jaws capable of application over the shoe at the inner and outer surfaces thereof and adapted, when said member is turned, to engage over and grip the shoe to hold said member in relation thereto and having an elongated shank extended beyond said jaws and adapted when the member is turned, to be positioned in line with the shoe, and means engageable with said shank for holding said member against reverse movement when turned to engage its jaws with the shoe.

6. A device of the character described having a member adapted to be fitted beneath the shoe provided with spaced reversely arranged jaws capable of application over the shoe at the inner and outer surfaces thereof and adapted, when said member is turned, to engage over and grip the shoe to hold said member in relation thereto and having an elongated resilient shank adapted, when said member is turned to engage its jaws with the shoe, to be flexed in line with and beneath said shoe, and means engageable with said shank for holding said member against reverse movement when turned to engage its jaws with the shoe.

In witness whereof I have hereunto signed my name in the presence of two subscribing witnesses.

HENRY H. STREESEMAN.

Witnesses:
W. C. ABBOTT,
J. D. CAPLINGER.

Copies of this patent may be obtained for five cents each, by addressing the "Commissioner of Patents, Washington, D. C."